United States Patent
Humphrey

[11] Patent Number: 6,155,279
[45] Date of Patent: Dec. 5, 2000

[54] PORTABLE SPORTS SHED

[76] Inventor: Bruce S. Humphrey, P.O. Box 576, Yellowknife NT, Canada, X1A 2N4

[21] Appl. No.: 09/350,928

[22] Filed: Jul. 12, 1999

[51] Int. Cl.[7] ........................................................ B60P 3/32
[52] U.S. Cl. .............................. 135/87; 296/164; 52/143; D12/405
[58] Field of Search ........................ 135/87, 95; 296/164, 296/156; 52/79.1, 143; D12/405, 401, 403

[56] References Cited

U.S. PATENT DOCUMENTS

| | | |
|---|---|---|
| D. 264,831 | 6/1982 | Dulisse .................................. D12/156 |
| D. 330,183 | 10/1992 | Zoromski ............................... D12/405 |
| D. 351,823 | 10/1994 | Lewellen et al. ...................... D12/405 |
| 3,629,884 | 12/1971 | Brown . |
| 3,708,199 | 1/1973 | Throssell . |
| 3,880,458 | 4/1975 | Jackson . |
| 4,275,533 | 6/1981 | Wright .................................... 52/79.1 |
| 4,807,924 | 2/1989 | Kottke .................................... 296/164 |
| 5,028,088 | 7/1991 | Del Monico et al. . |
| 5,339,852 | 8/1994 | Bull ......................................... 135/87 |
| 5,692,795 | 12/1997 | Mininger ................................ 296/164 |
| 5,934,738 | 8/1999 | Welles . |
| 5,988,195 | 11/1999 | Kaztner et al. . |

Primary Examiner—Robert W. Gibson, Jr.
Attorney, Agent, or Firm—Jones, Tullar & Cooper, P.C.

[57] ABSTRACT

A portable sports shed is adaptable for resting on the ground or for residing within the bed of a pick-up truck. The shed has a lower section which is sized to fit within the truck bed, and a wider upper section that has side walls and a transversely arcuate roof. Laterally extending bench sections interconnect the lower and upper sections. Each end wall of the shed has a pair of doors providing access to the shed and the floor has at least three parallel grooves therein which define skids on the exterior bottom. The grooves will accept the skids of a snowmobile or the wheels of an ATV, a lawn and garden tractor or one or more bicycles or motorcycles. When the shed is mounted in the truck it can protect a vehicle housed therein from the elements or it can be used as a camper. When resting on the ground it acts as a garage, permitting a vehicle to be driven in via one set of doors and out via the other set of doors. Trapdoors in the floor permit the shed to be used as an ice fishing hut and openings in the roof and side walls permit it to be used as a hunting blind or a playhouse. It can also be placed in water to act as a boathouse for a small dinghy or a personal watercraft.

9 Claims, 3 Drawing Sheets

PORTABLE SPORTS SHED

The present invention relates to a portable sports shed, one that can be used on land or in the bed of a standard pick-up truck.

BACKGROUND OF THE INVENTION

There are numerous accessories that are especially adapted for use with a standard pick-up truck, the most common including a bed liner, a cap, a tonneau cover, a utility enclosure and a camper body. The utility enclosure and the camper body involve structures which are intended to fit into the bed of the vehicle, between the wheel wells, and provide access to the interior thereof via a door or doors at the rear end. The vehicle operator can enter the enclosure or camper body to obtain equipment or to eat or sleep as is necessary. A camper body can be outfitted with all of the amenities of home, just like a travel trailer, although the interior is rather cramped and is best suited to one or two occupants at a time. A camper body is very heavy and a great deal of care must be exercised if one wants to remove the body from the bed of the truck so that the truck can be put to other uses. Similarly, a utility enclosure is quite heavy, and once it is inserted into the bed it is likely that it will not be removed therefrom without there being a specific need to use the truck with its bed exposed. A utility enclosure is, in essence, a larger version of a truck cap, and it will usually be filled with tools and other equipment.

SUMMARY OF THE INVENTION

There is a need for a new accessory for a pick-up truck, in the form of a shed or enclosure that can be readily removed from the bed of the truck and used in unique ways after removal. The enclosure should be light in weight, yet structurally rigid, and it should be relatively easy to remove it from the truck bed and to reinsert it therein when the time comes.

The present invention fulfills that need by providing a portable sports shed that can be easily placed in and removed from the bed of a standard pick-up truck. The shed of this invention is provided with large doors at each end so that when the shed is resting on the ground the owner will have ready access thereto from either end. The interior floor of the shed is provided with a plurality of longitudinally extending parallel grooves that are spaced apart to accommodate the skis of a snowmobile or the wheels of an ATV (all terrain vehicle), or of a riding lawnmower. The grooves could also accommodate the wheels of one or more motorcycles or bicycles. Suitable interior latch points can be utilized with chains or bungee cords to keep the vehicle stationary when it is being transported with the shed within the bed of the pick-up truck. If the shed is being used to store such a vehicle and is therefore resting on the ground it becomes very easy to remove the vehicle therefrom, because of the two sets of doors. One need only drive the vehicle forwardly out through the set of doors opposite the set through which the vehicle was brought into the shed.

The grooves that define the means for receiving skis or wheels of stored vehicles within the shed also define skids outside the shed, on which the shed rests. If the ends of these skids are upturned at the ends thereof then one could pull the shed with an ATV, a snowmobile, or a lawn and garden tractor to move it from one place to another.

The shed can be outfitted with interior accouterments which render it especially useful as an ice-fishing hut, a hunting blind, or even a playhouse for children. For example, the portion of the floor between the interior grooves could be provided with openable trapdoors that enable someone inside to gain access to the ground (or ice) below. Since the shed is designed to have an upper section that is wider than its lower section, there can be a pair of opposed seating areas or benches on which an ice-fisherman could sit while fishing through the trapdoors. For use as a hunting blind the roof of the shed could be provided with at least one openable trapdoor giving the hunter inside access to his prey outdoors. The side walls could be provided with windows as desired and all that would be required to make the shed into a great playhouse would be a child's imagination.

If the body of the shed of this invention is molded from a suitable plastics material and if care is taken to ensure that the shed is suitably anchored, then it could be placed in the water, where it will float, and it then could be used as a boathouse for a small dinghy or for a jet-powered personal water craft (PWC). Again, the vessel would have access to the shed from each end thereof and it could be driven in through one set of doors and out through the opposite set of doors.

Generally speaking and in summary of the above the present invention may be considered as providing a portable sports shed comprising: a lower section adapted for reception in a bed of a pick-up truck; an upper section attached to the lower section by way of longitudinally and laterally extending bench sections between the upper edge of the lower section and the lower edge of the upper section, the upper section including a transversely arcuate roof section; an end wall at each end of the shed, each end wall including therein at least one doorway providing access to the interior of the shed, there being a door hinged to each end wall for closing and sealing the doorway; the lower section including an interior bottom wall which includes at least three longitudinally extending and parallel grooves therein, the grooves extending downwardly and defining corresponding skids on the underside of the bottom wall; and means adjacent the exterior corners of the upper section for stabilizing the shed when it is removed from the pick-up truck and is resting on the ground.

DESCRIPTION OF THE PREFERRED EMBODIMENT

Figure 1:
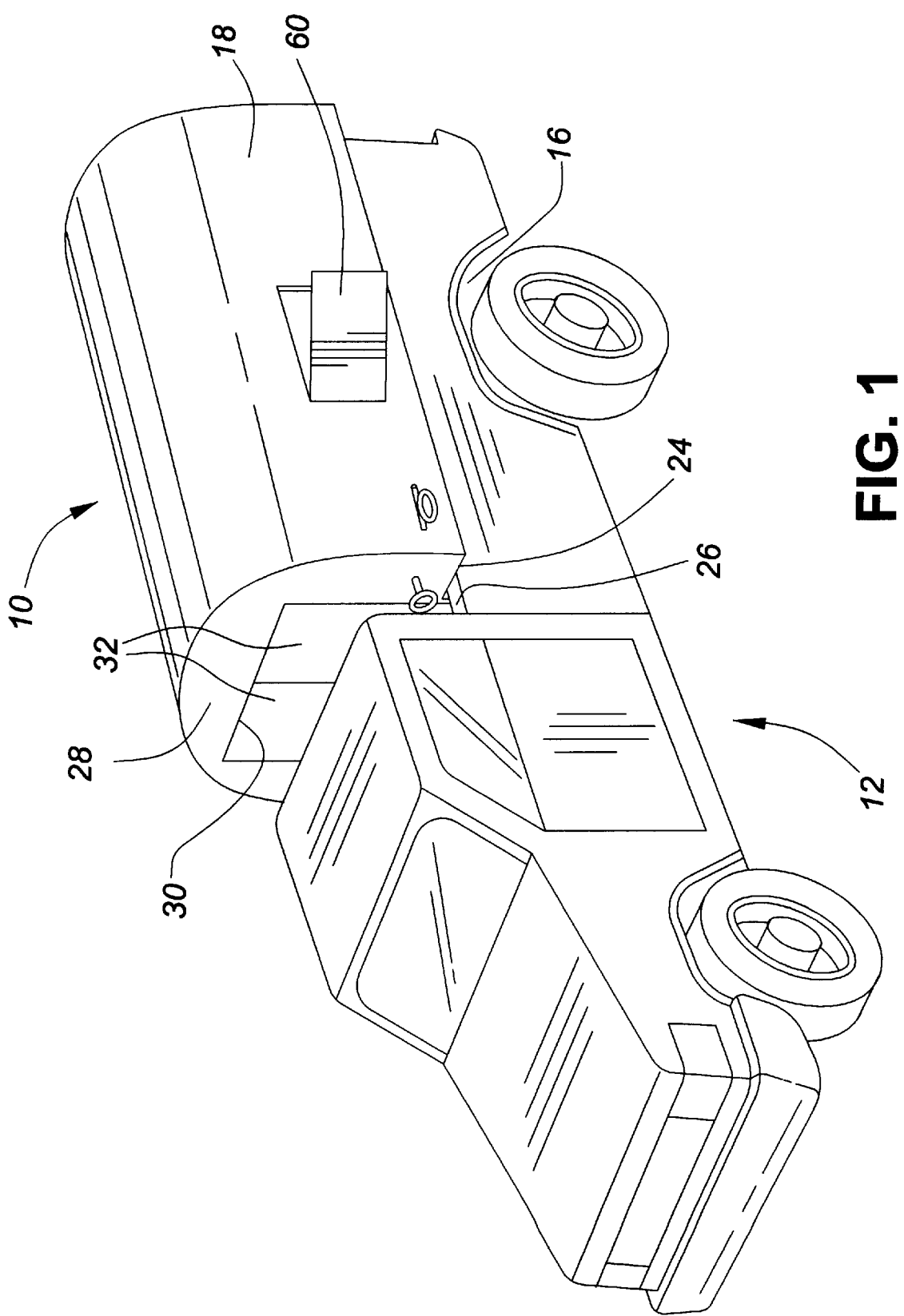
FIG. 1 is a perspective view of the portable sports shed of this invention in position within the bed of a pick-up truck and showing one end of the shed.

FIG. 1 illustrates a portable sports shed 10 of this invention as it rests within the bed of a pick-up truck 12. It will be seen that the shed 10 includes a generally parallelepiped lower section 14 that fits within the bed of the truck between the wheel wells 16 thereof and extends the full length of the bed. Preferably the tailgate of the truck is removed to accommodate the full length of the shed. It should be mentioned that the length of a truck bed will vary amongst manufacturers, with each manufacturer usually making both long and short bed trucks. A single shed should fit most trucks, although there might be some rear overhang when the shed is used with vehicles that are shorter than others.

The sports shed of this invention also includes an upper section 18 that has short side walls 20 and a transversely arcuate roof section 22. As can be seen, the upper section is wider at its base than the lower section 14. Between the upper edges of the lower section and the lower edges of the upper section there is a pair of longitudinally and laterally extending bench sections 24 that overly the upper edges 26 of the truck bed. At each end of the shed there is an end wall 28 that fills in the shed, each end wall having a doorway 30 opening to the interior of the shed. Each doorway 30 is generally rectangular and preferably covers most of the end wall 28 both in width and height. Hinged adjacent each doorway 30 is a pair of doors 32 that open outwardly to provide or deny access to the interior of the shed. Suitable hardware (not shown) for latching and locking the doors to the shed and to each other is provided and does not form a part of this invention.

Figure 2:
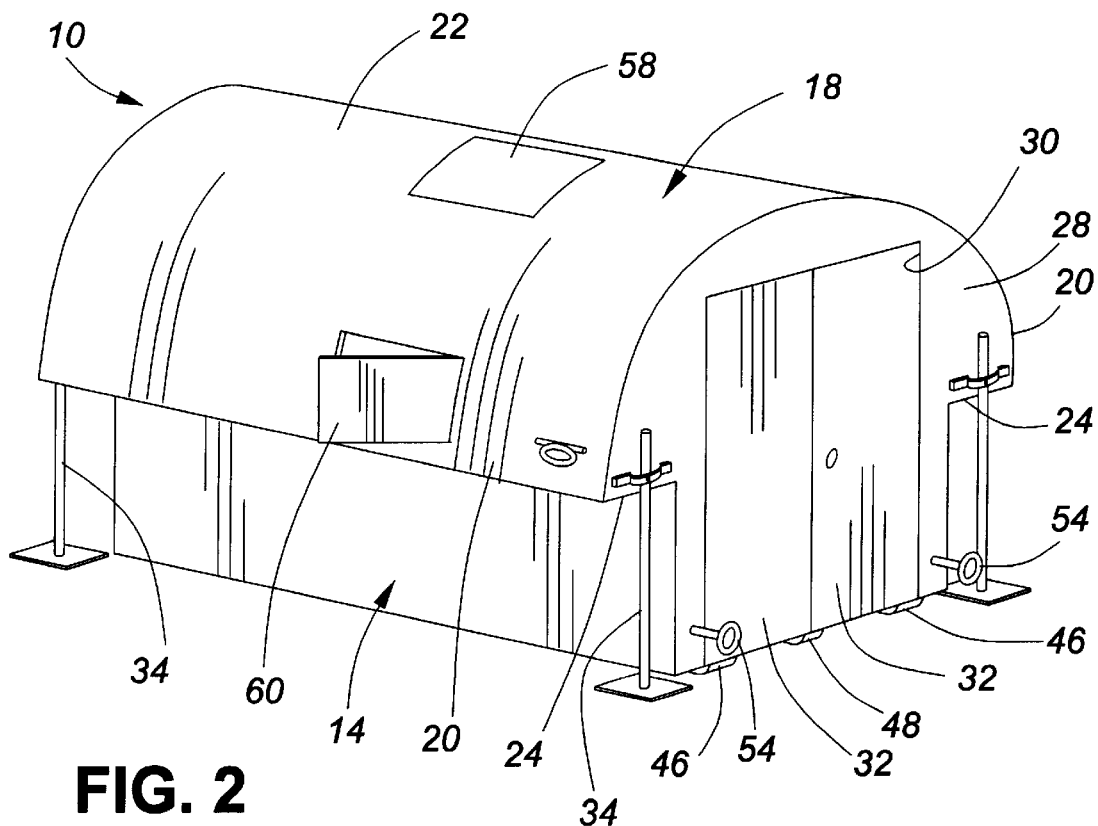
FIG. 2 is a perspective view of the same shed after removal and placement on the ground and showing the other end of the shed.

As indicated above, FIG. 1 shows the sports shed 10 residing within the bed of a pick-up truck. The shed can be used to house vehicles such as a snowmobile, an ATV, one or more motorcycles or one or more bicycles. It could also be used to house other equipment or even to serve as a camper if desired, at least for sleeping purposes. Additionally, the shed of this invention can be readily slid from the truck bed so that it can rest on the ground, as shown in FIG. 2. When the shed is resting on the ground, it serves as a garage for the vehicles mentioned above, it can serve as a storage facility for home or garden equipment, or it can serve as a playhouse for children. The shed is provided with stabilizing legs or rods 34 at the corners to provide extra support for the upper section, in particular for the cantilevered bench sections 24.

Figure 3:
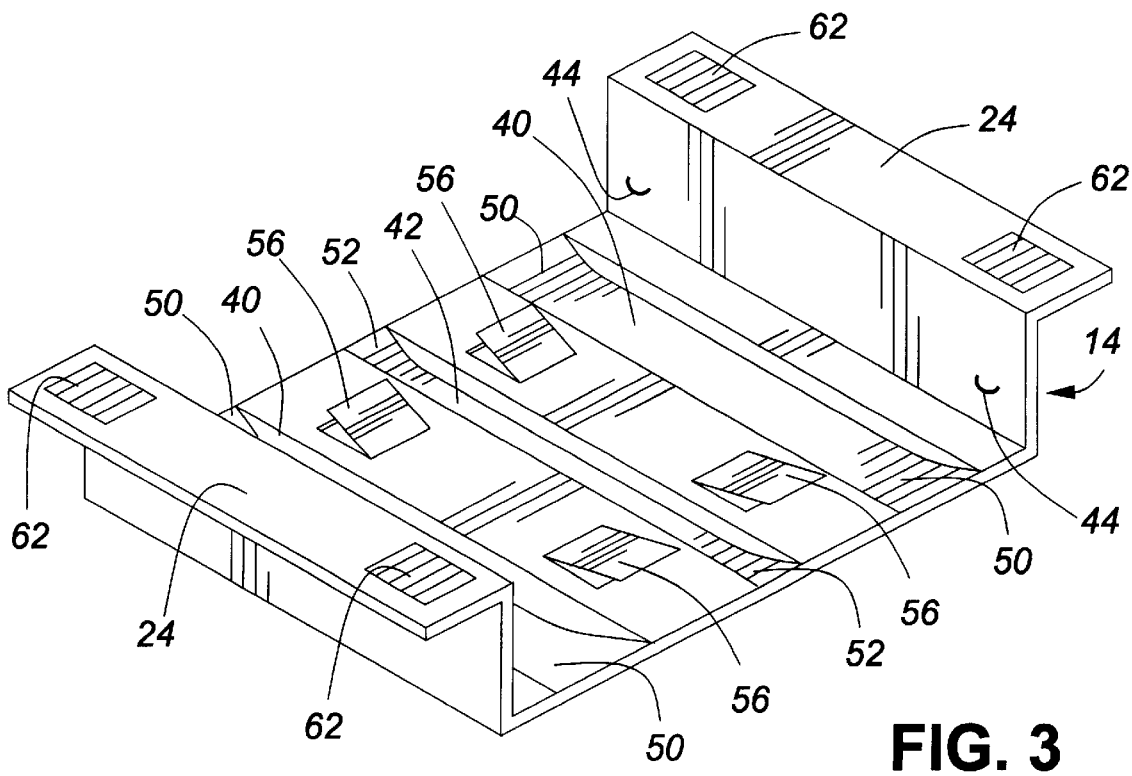
FIG. 3 is an interior perspective view of the lower and bench portions showing features of the shed of this invention.

With reference to FIG. 3 the interior of the shed will now be described. FIG. 3 clearly shows the bench sections 24 which extend laterally outwardly from the upper edges of the lower section 14. The floor 36 of the lower section is provided with a plurality, preferably three, of longitudinally and downwardly extending parallel grooves 40, 42. The outboard grooves are spaced apart by an amount, and have a width, such that they will accommodate therein the skis of a snowmobile, the wheels of an ATV, or the wheels of a riding lawnmower. The center groove 42 is somewhat narrower than the grooves 40 but it will accept the wheels of a motorcycle or the wheels of a bicycle. Adjacent the sides of the lower section are latch points or anchors 44 which one can use to attach an end of a chain, a rope or a bungee cord which can in turn be used to stabilize any vehicle housed within the shed to prevent unwanted movement thereof.

The grooves 40, 42 are molded into the floor of the lower section and they define exterior skids 46, 48 which exhibit outer running surfaces that actually contact the ground or the bed of a pick-up truck and support the shed either on the ground or in the bed of the truck. The running surfaces are upturned at the ends thereof as at 50, 52 to facilitate movement of the shed across the ground, across ice or snow, and during loading or removal of the shed into or out of the truck bed. In conjunction with the skids 46, 48 the shed 10 may be provided with removable hitch means 54 to facilitate towing of the shed by a snowmobile, an ATV, or a lawn and garden tractor.

Between the grooves 40, 42 the floor of the lower section is provided with a plurality, such as four, trapdoors 56 that are hinged to the floor and are provided with suitable latching means for keeping the trapdoors closed. If the shed is being used as an ice-fishing hut, having been towed by a snowmobile to an appropriate site, or having been brought to the site in a truck and off-loaded thereat, the occupants would be able to sit on the bench sections 24, open one or more of the trapdoors 56, cut a hole in the ice below the trapdoor and then fish in the protection offered by the shed. Preferably the shed will also have a door 58 in the roof portion of the upper section through which the chimney of a portable stove could pass in the event that it is desirable to include suitable heating means within the shed during ice-fishing. The door 58 could also serve, if large enough, to provide access to hunters within the shed if the shed were to be used as a duck or deer blind. For such a use one might want to have the exterior of the shed finished with a camouflage paint effect.

The side walls 20 of the shed can be provided with openable and latchable windows 60, which would render the shed appropriate for use as a playhouse. Since people might be spending considerable time within the shed in its various incarnations, as a playhouse, hunting blind, or ice-fishing hut, the bench sections 24 may include vents 62 at the ends thereof to ensure that fresh air can enter the shed. These vents would also help to prevent the formation of mildew on articles stored within the shed for prolonged periods of time.

Figure 4:
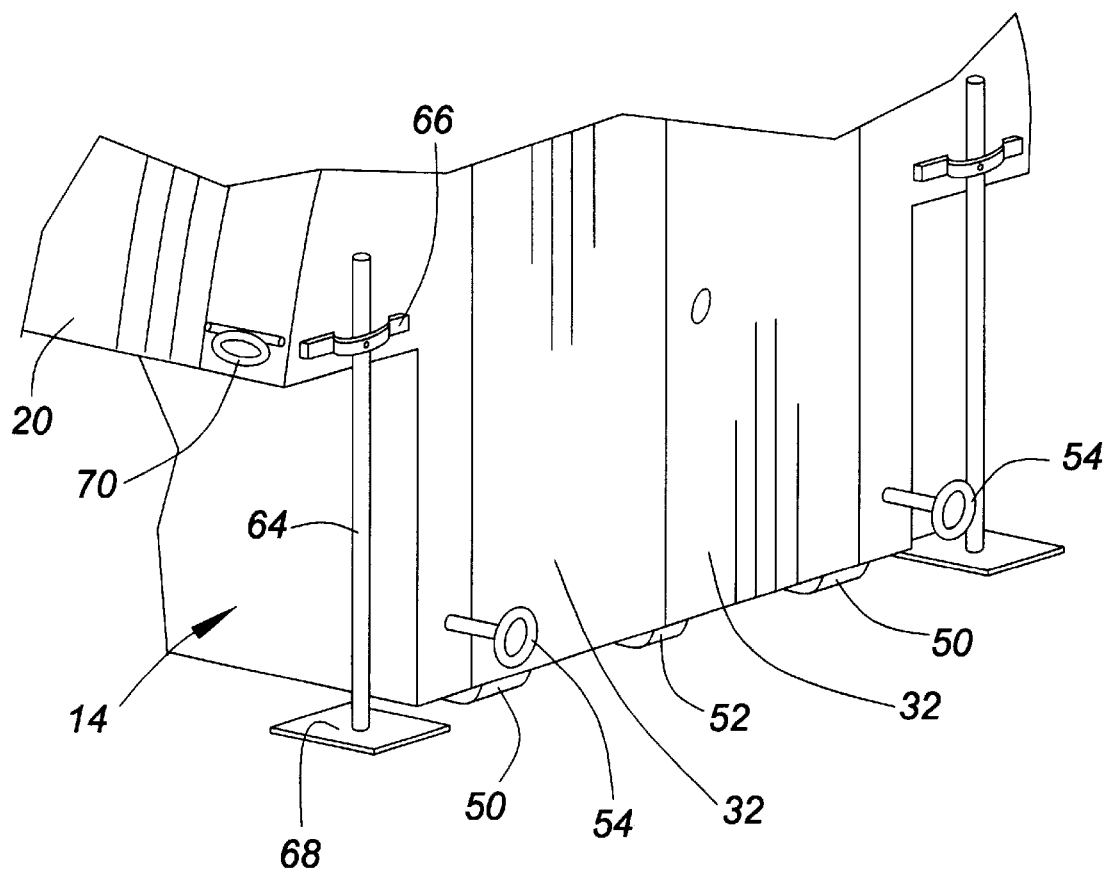
FIG. 4 is an enlarged view at one corner showing the lifting and stabilizing means used with the invention.

FIG. 4 shows details of the stabilizing means provided at the corners of the shed, which means help to support the shed when it is resting on the ground, snow or ice. The stabilizing means includes a rod 64 which is vertically slidable within a bushing 66 affixed to the shed. Suitable latching means such as a toggle or a set screw can be used to hold the rod at a desired position. The rod carries an enlarged foot 68 that rests on the ground, ice or snow. Once the shed is in its desired location the rods are permitted to fall downwardly in their bushing until the feet are on the ground. Then the latching means are tightened so that the rods are held stationary and the upper section of the shed will not move relative to the lower section.

Adjacent the stabilizing means are lifting rings 70 that can be used to facilitate the lifting of one end of the shed towards the open be of a pick-up truck. Once that end is resting on the bed one can use the lifting rings 70 at the other end to lift that end and slide the shed fully into the bed. The lifting rings can be used in conjunction with anchor points within the bed and ropes or other means to fix the shed in place within the truck bed.

As previously indicated the shed of this invention may be used to house vehicles such as a snowmobile, an ATV, a motorcycle, or a lawn and garden tractor. In each instance the vehicle can be driven into the shed via one set of doors 32 and it can be driven forwardly out of the shed through the opposite set of doors 32. This feature improves the versatility of the shed since it is not necessary to move the vehicle in reverse, a problem with some vehicles such as snowmobiles.

If the shed is formed of a suitable lightweight material, such as a molded plastics material, it is likely that the shed can float, even with the trapdoors 56 and the end doors 32 open. One could therefore place the shed in a lake or a river close to shore and use the shed as a boathouse for a small dinghy or a jet powered personal water craft (PWC). The vessel could enter the floating shed via one set of doors 32 and it could then exit the shed through the opposite set of doors, just as wit land-based vehicles. On course, it would be necessary to anchor the shed in a suitable manner to keep it from drifting away.

The shed of this invention is preferably constructed from injected molded plastics or from fiberglass. If the shed is constructed from a plurality of components, such as the lower section 14 and the upper section 18 the sections should be joined together along a horizontal seam 72 that is hermetically sealed. The shed could be made of other lightweight materials, such as aluminum, although one might not want to use the shed as a boathouse if the material thereof is a metal rather than a plastic.

The foregoing has described the present invention in its preferred form. It is understood that a skilled practitioner could modify the structure of the portable sports shed of this invention without departing from the spirit thereof and accordingly the protection to be afforded this invention is to be determined from the scope of the claims appended hereto.

I claim:

1. A portable sports shed comprising: a lower section adapted for reception in a bed of a pick-up truck; an upper section attached to said lower section by way of longitudinally and laterally extending bench sections between the upper edge of said lower section and the lower edge of said upper section, said upper section including a transversely arcuate roof section; an end wall at each end of the shed, each end wall including therein at least one doorway providing access to the interior of the shed, there being a door hinged to each end wall for closing and sealing the doorway; said lower section including an interior bottom wall which includes at least three longitudinally extending and parallel grooves therein, said grooves extending downwardly and defining corresponding skids on the underside of said bottom wall; and means adjacent the exterior corners of the upper section for stabilizing the shed when it is removed from the pick-up truck and is resting on the ground.

2. The portable sports shed of claim 1 wherein each of said skids is upturned at each end thereof.

3. The portable sports shed of claim 1 wherein a center one of said grooves is narrower than the others of said grooves, the others of said grooves having a width that is great enough to accept therein a snowmobile ski, an ATV wheel, or a wheel of a lawn an garden tractor.

4. The portable sports shed of claim 2 wherein a center one of said grooves is narrower than the others of said grooves, the others of said grooves having a width that is great enough to accept therein a snowmobile ski, an ATV wheel, or a wheel of a lawn an garden tractor.

5. The portable sports shed of claim 1 including at least one trapdoor hinged to said bottom wall for closing or opening an opening in said bottom wall located between a pair of said grooves.

6. The portable sports shed of claim 1 including an opening in said upper section and a door hinged to said upper section for closing and opening said last-mentioned opening.

7. The portable sports shed of claim 1 including vent means in said bench sections.

8. The portable sports shed of claim 1 wherein said stabilizing means includes a bushing secured to said upper section, an elongated rod receivable in said bushing, said rod having an enlarged foot at a lower end thereof, and latching means within said bushing for locking said rod relative to said bushing at a desired position with said foot resting on the ground or other surface.

9. The portable sports shed of claim 1 including a lifting ring at each corner of said upper section.

* * * * *